United States Patent
Cho

(10) Patent No.: US 9,494,070 B2
(45) Date of Patent: Nov. 15, 2016

(54) METHOD OF CONTROLLING AMMONIA AMOUNT ABSORBED IN SELECTIVE CATALYTIC REDUCTION CATALYST AND EXHAUST SYSTEM USING THE SAME

(71) Applicant: Hyundai Motor Company, Seoul (KR)

(72) Inventor: Jiho Cho, Yongin-si (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/557,121

(22) Filed: Dec. 1, 2014

(65) Prior Publication Data
US 2016/0076421 A1  Mar. 17, 2016

(30) Foreign Application Priority Data
Sep. 17, 2014 (KR) .................... 10-2014-0123355

(51) Int. Cl.
*F01N 3/00* (2006.01)
*F01N 3/20* (2006.01)

(52) U.S. Cl.
CPC ............. *F01N 3/208* (2013.01); *F01N 3/2066* (2013.01); *F01N 2560/026* (2013.01); *F01N 2560/06* (2013.01); *F01N 2560/14* (2013.01); *F01N 2610/02* (2013.01); *F01N 2900/0408* (2013.01); *F01N 2900/10* (2013.01); *F01N 2900/1602* (2013.01); *F01N 2900/1622* (2013.01)

(58) Field of Classification Search
CPC ...................... F01N 2560/026; F01N 2560/06; F01N 3/2066; F01N 2610/1453; F01N 2560/14; F01N 2610/02; F01N 2900/0408; F01N 2900/10; F01N 2900/1602; F01N 2900/1622; F01N 3/208
USPC .................................................. 60/272–324
See application file for complete search history.

(56) References Cited

U.S. PATENT DOCUMENTS

| | | | | |
|---|---|---|---|---|
| 2003/0182935 A1* | 10/2003 | Kawai | ............... | B01D 53/9495 60/286 |
| 2009/0056315 A1* | 3/2009 | Solbrig | ................... | F01N 3/208 60/286 |
| 2009/0288396 A1* | 11/2009 | Sakata | .................... | F01N 3/208 60/286 |
| 2010/0024390 A1* | 2/2010 | Wills | .................... | F01N 13/009 60/274 |
| 2010/0024397 A1* | 2/2010 | Chi | ......................... | F01N 3/106 60/285 |
| 2011/0203259 A1* | 8/2011 | Upadhyay | ............... | F01N 3/208 60/274 |
| 2013/0255233 A1* | 10/2013 | Yasui | ....................... | F01N 3/10 60/286 |
| 2013/0340412 A1* | 12/2013 | Ichikawa | .................. | F01N 3/08 60/286 |
| 2015/0176459 A1* | 6/2015 | Cho | ....................... | F01N 3/2066 60/274 |

FOREIGN PATENT DOCUMENTS

| | | |
|---|---|---|
| JP | 2010-53703 A | 3/2010 |
| JP | 2014-101778 A | 6/2014 |
| KR | 10-2010-0045785 A | 5/2010 |
| KR | 10-2011-0026331 A | 3/2011 |
| KR | 10-1145621 B1 | 5/2012 |
| WO | WO 2008/126648 A1 | 10/2008 |

* cited by examiner

*Primary Examiner* — Jesse Bogue
(74) *Attorney, Agent, or Firm* — Morgan, Lewis & Bockius LLP

(57) ABSTRACT

A method of controlling ammonia (NH3) amount absorbed in a selective catalytic reduction (SCR) catalyst may include determining a target NH3 absorption amount considering a safety factor on a basis of NH3 absorption characteristics according to a temperature of the SCR catalyst, determining a predicted NH3 reaction amount according to a current driving condition, and controlling injection of urea according to the target NH3 absorption amount and the predicted NH3 reaction amount.

10 Claims, 4 Drawing Sheets

METHOD OF CONTROLLING AMMONIA AMOUNT ABSORBED IN SELECTIVE CATALYTIC REDUCTION CATALYST AND EXHAUST SYSTEM USING THE SAME

CROSS-REFERENCE TO RELATED APPLICATION

The present application claims priority to Korean Patent Application No. 10-2014-0123355 filed Sep. 17, 2014, the entire contents of which is incorporated herein for all purposes by this reference.

BACKGROUND OF THE INVENTION

1. Field of the Invention

The present invention relates to a method of controlling ammonia amount absorbed in a selective catalytic reduction catalyst and an exhaust system using the same. More particularly, the present invention relates to a method of controlling ammonia amount adsorbed in a selective catalytic reduction (SCR) catalyst and an exhaust system using the same that improves performance of the SCR catalyst by adsorbing more ammonia (NH3) in the SCR catalyst while preventing slip of the NH3 from the SCR catalyst.

2. Description of Related Art

Generally, exhaust gas flowing out from an engine through an exhaust manifold is urged into a catalytic converter mounted at an exhaust pipe and is purified therein. After that, the noise of the exhaust gas is decreased while passing through a muffler and the exhaust gas is then emitted into the air through a tail pipe. The catalytic converter purifies pollutants contained in the exhaust gas. In addition, a particulate filter for trapping particulate matter (PM) contained in the exhaust gas is mounted in the exhaust pipe.

A selective catalytic reduction (SCR) catalyst is one type of such a catalytic converter.

Reducing agent such as urea, ammonia, carbon monoxide and hydrocarbon (HC) reacts better with nitrogen oxide than with oxygen in the SCR catalyst.

An exhaust system of a vehicle provided with the SCR catalyst includes an urea tank and dosing module. The dosing module injects reducing agent such as urea into the exhaust gas passing through the exhaust pipe, and thereby the SCR catalyst purifies the nitrogen oxide efficiently.

The reducing agent injected from the dosing module is adsorbed in the SCR catalyst, is released if the exhaust gas containing the nitrogen oxide passes through the SCR catalyst, and reacts with the nitrogen oxide.

However, amount of the reducing agent adsorbed in the SCR catalyst is closely related to temperature of the SCR catalyst. Therefore, if the amount of the reducing agent more than maximum amount of the reducing agent that can be adsorbed in current temperature of the SCR catalyst is adsorbed in the SCR catalyst, a portion of the reducing agent is slipped from the SCR catalyst.

Ammonia is typically used as the reducing agent of the SCR catalyst. If the ammonia is slipped from the SCR catalyst, the slipped ammonia may cause stink and customers may have complaints. Therefore, it is very important to prevent the reducing agent from being slipped from the SCR catalyst.

According to a conventional method of controlling NH3 amount adsorbed in the SCR catalyst, the SCR catalyst is controlled to adsorb NH3 amount obtained by dividing maximum NH3 amount at the current temperature of the SCR catalyst by a substantially large safety factor. That is, the SCR catalyst is controlled to adsorb the NH3 amount that is smaller than the maximum NH3 amount so as to prevent slip of the NH3 from the SCR catalyst. Therefore, the SCR catalyst may underperform.

In addition, since the SCR catalyst underperforms, volume of the SCR catalyst should be increased.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of controlling ammonia amount adsorbed in a selective catalytic reduction catalyst and an exhaust system using the same having advantages of improving performance of the SCR catalyst and reducing volume of the SCR catalyst by adsorbing more NH3 in the SCR catalyst while preventing slip of the NH3 from the SCR catalyst.

According to various aspects of the present invention, a method of controlling ammonia (NH3) amount absorbed in a selective catalytic reduction (SCR) catalyst may include determining a target NH3 absorption amount considering a safety factor on a basis of NH3 absorption characteristics according to a temperature of the SCR catalyst, determining a predicted NH3 reaction amount according to a current driving condition, and controlling injection of urea according to the target NH3 absorption amount and the predicted NH3 reaction amount.

The target NH3 absorption amount considering the safety factor may be determined from the NH3 absorption characteristics according to the temperature of the SCR catalyst and the safety factor according to the temperature of the SCR catalyst.

The predicted NH3 reaction amount according to the current driving condition may be determined based on NOx amount exhausted from an engine at the current driving condition and NOx purification rate at a current temperature of the SCR catalyst.

The injection of the urea may be controlled such that NH3 amount corresponding to a sum of the target NH3 absorption amount and the predicted NH3 reaction amount is absorbed in the SCR catalyst.

The determining the target NH3 absorption amount considering a safety factor may be performed when a current temperature of the SCR catalyst is higher than or equal to a urea conversion temperature.

The NH3 absorption characteristics according to the temperature of the SCR catalyst and the safety factor according to the temperature of the SCR catalyst or the target NH3 absorption amount considering safety factor, and the predicted NH3 reaction amount according to the current driving condition may be stored in a non-volatile memory of a vehicle.

According to various aspects of the present invention, an exhaust system may include an engine generating driving torque by burning mixture of air and fuel and exhausting exhaust gas generated during combustion through an exhaust pipe, a reducing agent supplier mounted on the exhaust pipe downstream of the engine and adapted to inject urea or ammonia into the exhaust gas, wherein the urea is decomposed into the ammonia, a selective catalytic reduction (SCR) catalyst mounted on the exhaust pipe downstream of the reducing agent supplier and adapted to adsorb the ammonia and to reduce nitrogen oxide contained in the exhaust gas using adsorbed, injected or decomposed ammonia, a controller adapted to receive information on a temperature of the SCR catalyst and a current driving condition, to determine a target NH3 absorption amount considering a safety factor, to determine a predicted NH3 reaction amount according to the current driving condition, and controlling an amount of the urea or the ammonia injected from the reducing agent supplier according to the target NH3 absorption amount and the predicted NH3 reaction amount.

The target NH3 absorption amount considering the safety factor may be determined from the ammonia absorption characteristics according to the temperature of the SCR catalyst and the safety factor according to the temperature of the SCR catalyst.

The predicted NH3 reaction amount according to the current driving condition may be determined based on NOx amount exhausted from the engine at the current driving condition and NOx purification rate at a current temperature of the SCR catalyst.

The controller may control injection amount of the urea or the ammonia injected from the reducing agent supplier such that NH3 amount corresponding to a sum of the target NH3 absorption amount and the predicted NH3 reaction amount is absorbed in the SCR catalyst.

The controller may be adapted to determine the target NH3 absorption amount considering the safety factor only when a current temperature of the SCR catalyst is higher than or equal to a urea conversion temperature.

The NH3 absorption characteristics according to the temperature of the SCR catalyst and the safety factor according to the temperature of the SCR catalyst or the target NH3 absorption amount considering the safety factor, and the predicted NH3 reaction amount according to the current driving condition may be stored in a non-volatile memory of a vehicle.

As described above, various embodiments of the present invention may improve performance of the selective catalytic reduction catalyst and reduce volume of the selective catalytic reduction catalyst by adsorbing more NH3 in the selective catalytic reduction catalyst while the ammonia is prevented from being slipped from the selective catalytic reduction catalyst.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
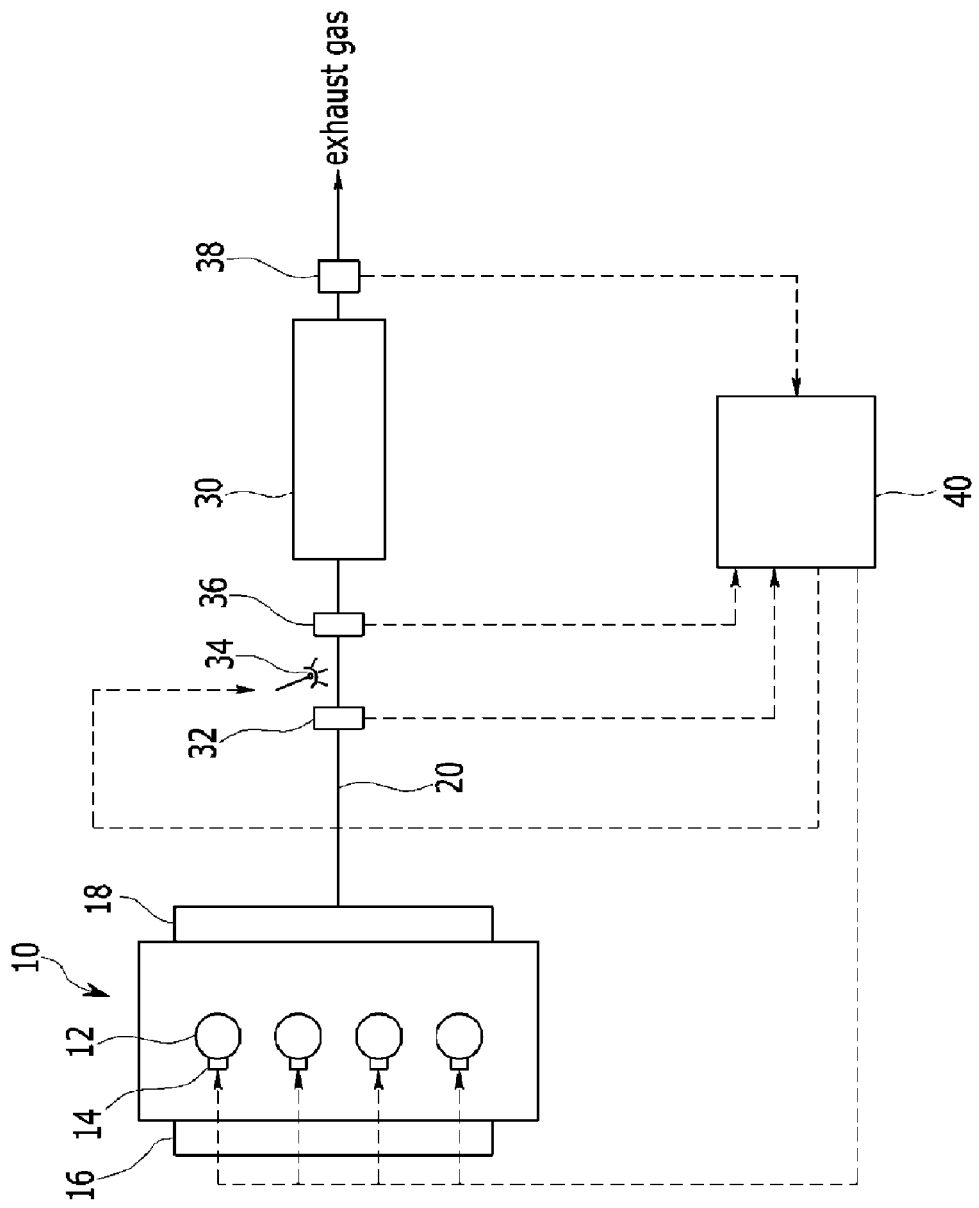
FIG. 1 is a schematic diagram of an exemplary exhaust system according to the present invention.

FIG. 1 is a schematic diagram of an exhaust system according to various embodiments of the present invention.

As shown in FIG. 1, nitrogen oxide in exhaust gas is removed while the exhaust gas generated in an engine 10 passes through a selective catalytic reduction (SCR) catalyst 30. If necessary, a particulate filter for trapping particulate matter contained in the exhaust gas and/or an oxidation catalyst for oxidizing carbon monoxide or hydrocarbon contained in the exhaust gas may be used. The exhaust system illustrated in FIG. 1 shows a simplified layout of an exhaust system to which the spirit of the present invention can be applied, and it is to be understood that a range of the present invention is not limited to the exhaust system illustrated in FIG. 1.

The engine 10 burns air/fuel mixture in which fuel and air are mixed so as to convert chemical energy into mechanical energy. The engine 10 is connected to an intake manifold 16 so as to receive the air into a combustion chamber 12, and is connected to an exhaust manifold 18 such that the exhaust gas generated in combustion process is gathered in the exhaust manifold 18 and is exhausted to the exterior. An injector 14 is mounted in the combustion chamber 12 so as to inject the fuel into the combustion chamber 12.

An exhaust pipe 20 is connected to the exhaust manifold 18 and is adapted to discharge the exhaust gas to the exterior of a vehicle.

The SCR catalyst 30 is mounted on the exhaust pipe 20 and is adapted to reduce the nitrogen oxide contained in the exhaust gas into nitrogen gas using reducing agent.

For these purposes, the exhaust system further includes a urea tank, a urea pump and a dosing module 34. In addition, urea is injected by the dosing module 34 in the present invention but it is not limited that the dosing module 34 just injects the urea. That is, the dosing module 34 may inject ammonia. Furthermore, reducing agents other than the ammonia can be injected together with the ammonia or by itself.

The dosing module 34 injects the urea pumped by the urea pump into the exhaust pipe 20. The dosing module 34 is mounted on the exhaust pipe 20 between the engine 10 and the SCR catalyst 30 and injects the urea into the exhaust gas before entering the SCR catalyst 30. The urea injected into the exhaust gas is decomposed into the ammonia and the decomposed ammonia is used as the reducing agent for the nitrogen oxide.

Meanwhile, the urea tank, the urea pump and the dosing module described in this specification are examples of reducing agent suppliers, and it is to be understood that a range of the present invention is not limited to the examples of the reducing agent suppliers. That is, other types of the reducing agent suppliers can be used in various embodiments of the present invention.

The exhaust system further includes a plurality of sensors including a first NOx sensor 32, a temperature sensor 36 and second NOx sensor 38.

The first NOx sensor 32 is mounted on the exhaust pipe 20 upstream of the SCR catalyst 30 and detects NOx amount contained in the exhaust gas at an upstream of the SCR catalyst.

The temperature sensor 36 is mounted on the exhaust pipe 20 upstream of the SCR catalyst 30 or in the SCR catalyst 30, and detects the temperature of the exhaust gas at the upstream of the SCR catalyst 30 or in the SCR catalyst 30. For better comprehension and ease of description, the temperature of the SCR catalyst 30 described in the present invention may be temperature of the exhaust gas at the upstream of the SCR catalyst 30 or temperature of the exhaust gas in the SCR catalyst 30.

The second NOx sensor 38 is mounted on the exhaust pipe 20 downstream of the SCR catalyst 30 and detects the NOx amount contained in the exhaust gas at a downstream of the SCR catalyst 30. In various embodiments, the NOx amount at the upstream of the SCR catalyst 30 may be predicted based on exhaust flow rate, operation history of the engine, temperature of the SCR catalyst 30, injection amount of the reducing agent and/or amount of the reducing agent absorbed in the SCR catalyst 30, instead of using the second NOx sensor 38.

The exhaust system further includes a controller 40. The controller 40 controls operation of the injector 14 and the dosing module 34 based on the detection of the first and second NOx sensors 32 and 38 respectively and the temperature sensor 36.

Figure 2:
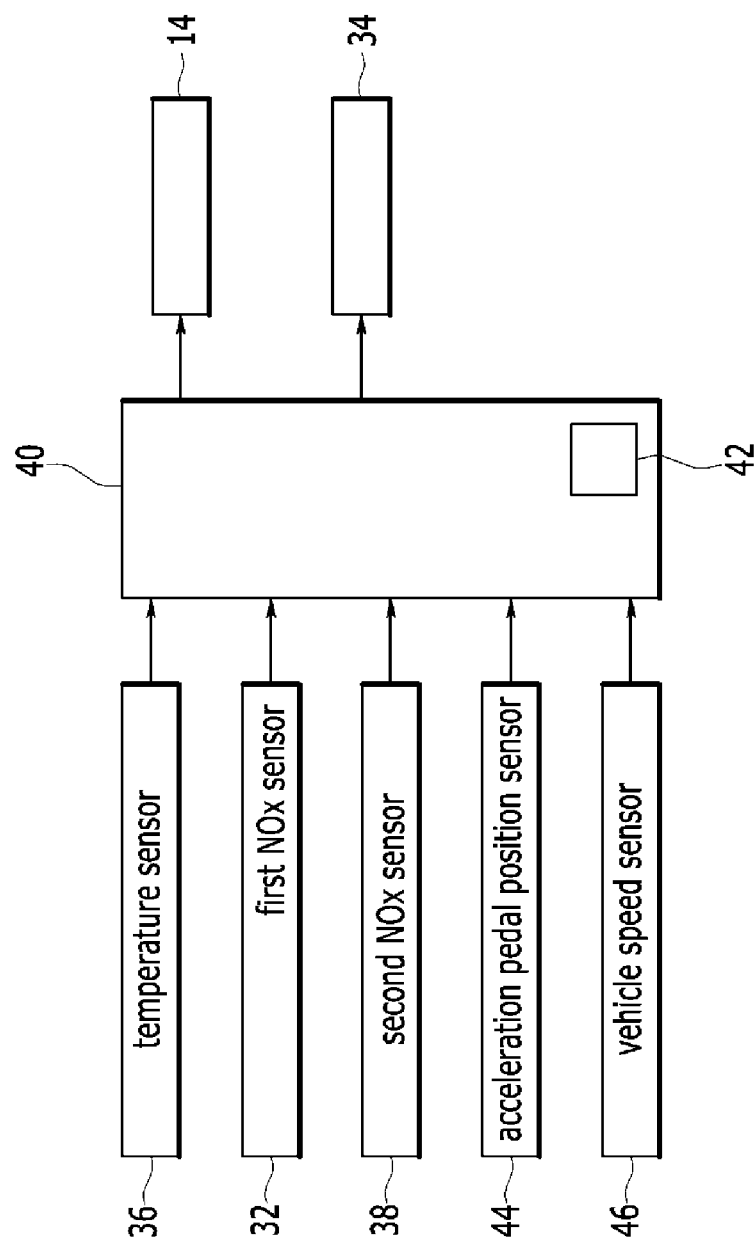
FIG. 2 is a block diagram of an exhaust system executing an exemplary method of controlling ammonia amount adsorbed in a selective catalytic reduction catalyst according to the present invention.

FIG. 2 is a block diagram of an exhaust system executing a method of controlling ammonia amount adsorbed in a selective catalytic reduction catalyst according various embodiments of the present invention.

The temperature sensor 36 detects the temperature of the SCR catalyst 30 and transmits a signal corresponding thereto to the controller 40.

The first NOx sensor 32 detects the NOx amount contained in the exhaust gas at the upstream of the SCR catalyst 30 and transmits a signal corresponding thereto to the controller 40.

The second NOx sensor 38 detects the NOx amount contained in the exhaust gas at the downstream of the SCR catalyst 30 and transmits a signal corresponding thereto to the controller 40.

The exhaust system further includes various sensors including an accelerator pedal position sensor 44 and a vehicle speed sensor 46 for detecting a current driving condition.

The accelerator pedal position sensor 44 detects a position of an accelerator pedal and transmits a signal corresponding thereto to the controller 40.

The vehicle speed sensor 46 detects a current vehicle speed and transmits a signal corresponding thereto to the controller 40.

The controller 40 determines a target NH3 absorption amount considering a safety factor based on the temperature of the SCR catalyst 30 detected by the temperature sensor 36, determines a predicted NH3 reaction amount according to the current driving condition based on the detected values by the accelerator pedal position sensor 44, the vehicle speed sensor 46, the first and second NOx sensors 32 and 38 and the temperature sensor 36, and controls a urea amount injected by the dosing module 34 based on the target NH3 absorption amount and the predicted NH3 reaction amount.

In addition, the controller 40 may evaluate performance of the SCR catalyst 30 based on the NOx contained in the exhaust gas at the downstream of the SCR catalyst 30 that is detected by the second NOx sensor 38.

Furthermore, the controller 40 may control fuel amount that is injected by the injector 14 and injection timing based on driving conditions of the vehicle.

The controller 40 can be realized by one or more processors activated by a predetermined program, and the predetermined program can be programmed to perform each step of a method of controlling ammonia amount adsorbed in a selective catalytic reduction catalyst according to various embodiments of the present invention.

Meanwhile, the controller 40 may include a memory 42. It is exemplified in the present invention but is not limited that the memory 42 is provided in the controller 40. The memory 42 may be a non-volatile memory.

Figure 4:
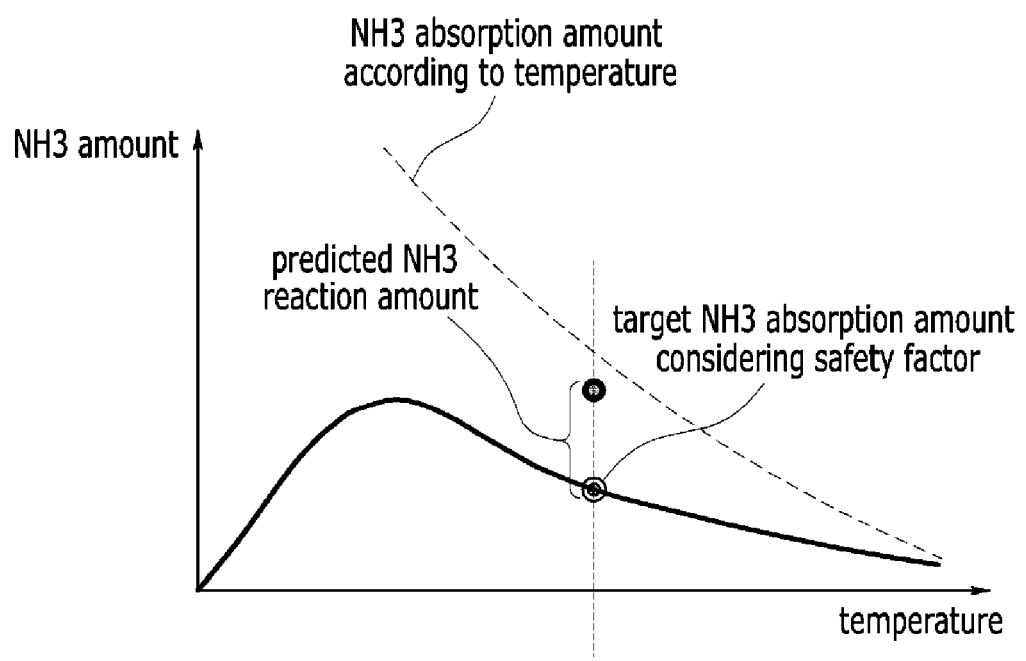
FIG. 4 is a graph illustrating absorbing amount of NH3 according to a temperature, a target NH3 absorption amount considering a safety factor, and a predicted reaction amount.

As shown in FIG. 4, the NH3 absorption characteristics according to the temperature of the SCR catalyst 30 and the safety factor according to the temperature of the SCR catalyst or the target NH3 absorption amount considering the safety factor, and the predicted NH3 reaction amount according to the current driving condition may be stored in the memory 42.

Figure 3:
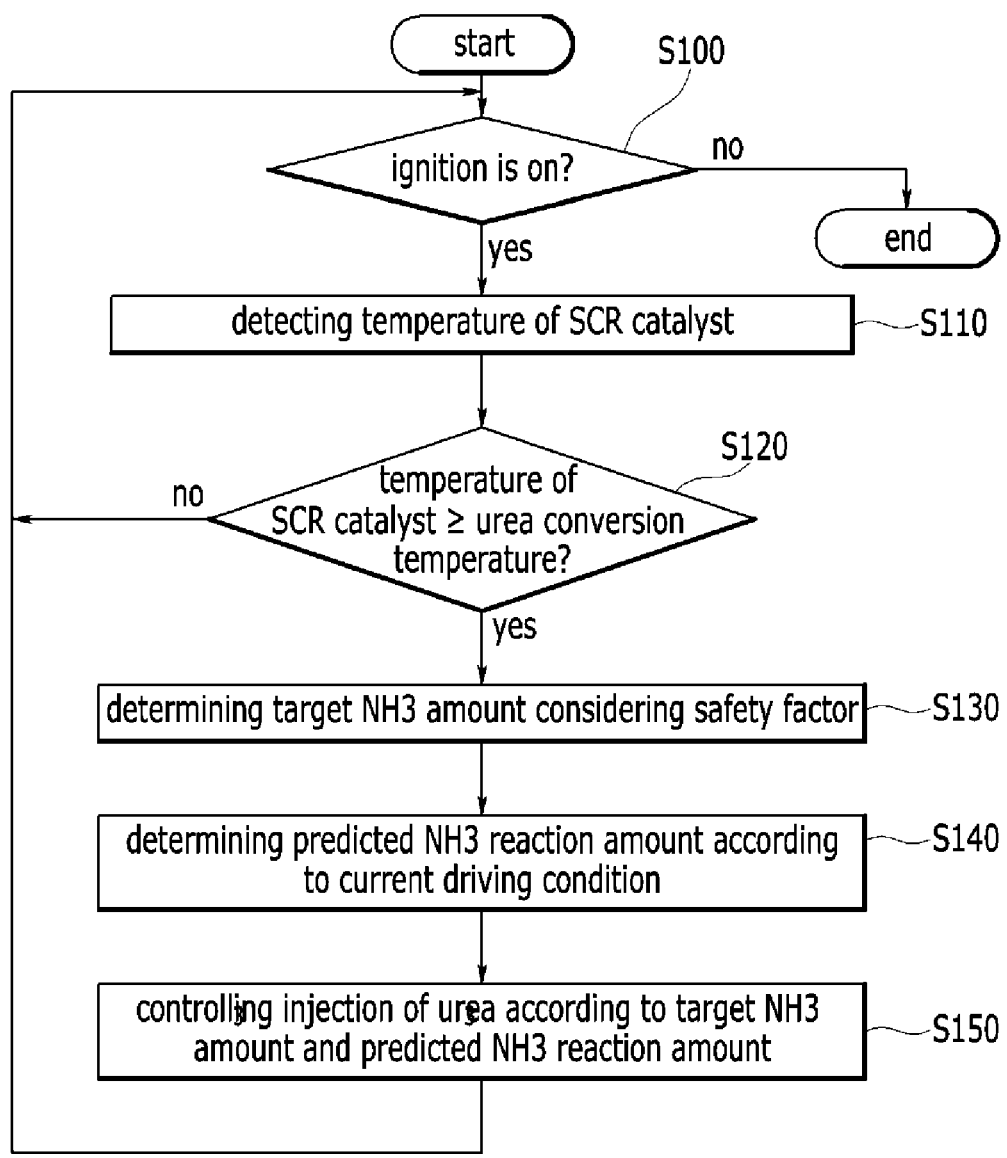
FIG. 3 is a flowchart of the exemplary method of controlling ammonia amount adsorbed in the selective catalytic reduction catalyst according to the present invention.

FIG. 3 is a flowchart of a method of controlling ammonia amount adsorbed in a selective catalytic reduction catalyst according to various embodiments of the present invention.

As shown in FIG. 3, a method of controlling ammonia amount adsorbed in a selective catalytic reduction catalyst according to various embodiments of the present invention begins when an ignition key is switched on at step S100.

If the ignition key is switched on at the step S100, the temperature sensor 36 detects the current temperature of the SCR catalyst 30 at step S110 and transmits the signal corresponding thereto to the controller 40.

If the controller 40 receives the signal corresponding to the current temperature of the SCR catalyst 30, the controller 40 determines whether the current temperature of the SCR catalyst 30 is higher than or equal to urea conversion temperature at step S120. Herein, the urea conversion temperature is temperature where the urea injected by the dosing module 34 can be decomposed into the ammonia and the decomposed ammonia can be adsorbed in the SCR catalyst 30. If the urea is injected at temperature lower than the urea conversion temperature, the urea cannot be decomposed into the ammonia nor cannot be adsorbed in the SCR catalyst 30 and be slipped from the SCR catalyst 30 if being decomposed. Therefore, the method according to various embodiments of the present invention can be operated normally at a temperature higher than or equal to the urea conversion temperature.

If the current temperature of the SCR catalyst 30 is lower than the urea conversion temperature at the step S120, the method returns to the step S100. If the current temperature of the SCR catalyst 30 is higher than or equal to the urea conversion temperature at the step S120, the controller 40 determines the target NH3 absorption amount considering the safety factor at step S130. As shown in FIG. 4, the NH3 absorption characteristics according to the temperature of the SCR catalyst 30 and the safety factor according to the temperature of the SCR catalyst or the target NH3 absorption amount considering the safety factor, and the predicted NH3 reaction amount according to the current driving condition may be stored in the memory 42 of the controller 40. Therefore, the controller 40 may read the target NH3 absorption amount considering the safety factor at the current temperature of the SCR catalyst from the memory 42. Since the memory 42 is a non-volatile memory, the target NH3 absorption amount considering the safety factor is not erased from the memory 42.

Meanwhile, the target NH3 absorption amount considering the safety factor can be obtained by multiplying the NH3 absorption characteristics according to the temperature of the SCR catalyst 30 to the safety factor according to the temperature of the SCR catalyst 30. In this case, since purification characteristics of the nitrogen oxide changes according to the temperature of the SCR catalyst 30, the safety factor is also changed according to the temperature of the SCR catalyst 30.

After that, the controller 40 determines the predicted NH3 reaction amount according to the current driving condition at step S140. That is, the controller 40 predicts the current driving condition based on the position of the accelerator pedal, the current vehicle speed, the fuel injection amount and the fuel injection timing, predicts the NOx amount exhausted from the engine based on the predicted driving condition, and predicts NOx purification rate based on the current temperature of the SCR catalyst 30. Therefore, the controller 40 determines the predicted NH3 reaction amount according to the current driving condition based on the NOx amount exhausted from the engine and the NOx purification rate. The predicted NH3 reaction amount according to the current driving condition is a predicted amount of the NH3 that will be removed through reaction with the NOx at the SCR catalyst 30. Even though the SCR catalyst 30 absorbs the NH3 more by the predicted NH3 reaction amount, the predicted NH3 reaction amount will be removed through the reaction with the NOx. Therefore, the NH3 does not slip from the SCR catalyst 30. That is, the more NH3 is absorbed but the NH3 does not slip.

After that, the controller 40 controls the dosing module 34 according to the target NH3 absorption amount and the predicted NH3 reaction amount so as to control the injection amount of the urea into the exhaust gas. As shown in FIG. 4, the controller 40 controls the urea injection into the exhaust gas such that the NH3 amount corresponding to a sum of the target NH3 absorption amount considering the safety factor and the predicted NH3 reaction amount at the current temperature of the SCR catalyst is absorbed in the SCR catalyst 30.

After that, the controller 40 returns to the step S100 and repeats the step S100 to the step S150 during the ignition key being on.

As shown in FIG. 4, compared with a conventional method considering only the safety factor, the SCR catalyst 30 absorbs the NH3 more at the same temperature of the SCR catalyst 30 according to various embodiments of the present invention. Therefore, full performance of the SCR catalyst 30 may be utilized and volume of the SCR catalyst 30 may be reduced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of controlling ammonia (NH3) amount absorbed in a selective catalytic reduction (SCR) catalyst, comprising:
   determining a target NH3 absorption amount considering a safety factor on a basis of NH3 absorption characteristics according to a temperature of the SCR catalyst;
   determining a predicted NH3 reaction amount according to a current driving condition; and
   controlling injection of urea according to the target NH3 absorption amount and the predicted NH3 reaction amount,
   wherein the injection of the urea is controlled such that NH3 amount corresponding to a sum of the target NH3 absorption amount and the predicted NH3 reaction amount is absorbed in the SCR catalyst.

2. The method of claim 1, wherein the target NH3 absorption amount considering the safety factor is determined from the NH3 absorption characteristics according to the temperature of the SCR catalyst and the safety factor according to the temperature of the SCR catalyst.

3. The method of claim 1, wherein the predicted NH3 reaction amount according to the current driving condition is determined based on NOx amount exhausted from an engine at the current driving condition and NOx purification rate at a current temperature of the SCR catalyst.

4. The method of claim 1, wherein the determining the target NH3 absorption amount considering a safety factor is performed when a current temperature of the SCR catalyst is higher than or equal to a urea conversion temperature.

5. The method of claim 1, wherein the NH3 absorption characteristics according to the temperature of the SCR catalyst and the safety factor according to the temperature of the SCR catalyst or the target NH3 absorption amount considering safety factor, and the predicted NH3 reaction amount according to the current driving condition are stored in a non-volatile memory of a vehicle.

6. An exhaust system comprising:
   an engine generating driving torque by burning mixture of air and fuel and exhausting exhaust gas generated during combustion through an exhaust pipe;
   a reducing agent supplier mounted on the exhaust pipe downstream of the engine and adapted to inject urea or ammonia into the exhaust gas, wherein the urea is decomposed into the ammonia;

a selective catalytic reduction (SCR) catalyst mounted on the exhaust pipe downstream of the reducing agent supplier and adapted to adsorb the ammonia and to reduce nitrogen oxide contained in the exhaust gas using adsorbed, injected or decomposed ammonia;

a controller adapted to receive information on a temperature of the SCR catalyst and a current driving condition, to determine a target NH3 absorption amount considering a safety factor, to determine a predicted NH3 reaction amount according to the current driving condition, and controlling an amount of the urea or the ammonia injected from the reducing agent supplier according to the target NH3 absorption amount and the predicted NH3 reaction amount, wherein the controller controls injection amount of the urea or the ammonia injected from the reducing agent supplier such that NH3 amount corresponding to a sum of the target NH3 absorption amount and the predicted NH3 reaction amount is absorbed in the SCR catalyst.

7. The exhaust system of claim 6, wherein the target NH3 absorption amount considering the safety factor is determined from the ammonia absorption characteristics according to the temperature of the SCR catalyst and the safety factor according to the temperature of the SCR catalyst.

8. The exhaust system of claim 6, wherein the predicted NH3 reaction amount according to the current driving condition is determined based on NOx amount exhausted from the engine at the current driving condition and NOx purification rate at a current temperature of the SCR catalyst.

9. The exhaust system of claim 6, wherein the controller is adapted to determine the target NH3 absorption amount considering the safety factor only when a current temperature of the SCR catalyst is higher than or equal to a urea conversion temperature.

10. The exhaust system of claim 7, wherein the NH3 absorption characteristics according to the temperature of the SCR catalyst and the safety factor according to the temperature of the SCR catalyst or the target NH3 absorption amount considering the safety factor, and the predicted NH3 reaction amount according to the current driving condition are stored in a non-volatile memory of a vehicle.

* * * * *